United States Patent
Semaan et al.

(10) Patent No.: US 7,633,858 B2
(45) Date of Patent: Dec. 15, 2009

(54) PROVIDING EMBEDDED PROTECTION IN A NETWORK CROSS-CONNECT DEVICE FOR SONET NETWORKS

(75) Inventors: Ghassan Semaan, Fremont, CA (US); Ramana Kalapatapu, San Jose, CA (US)

(73) Assignee: Ciena Corporation, Linthicum, MD (US)

( * ) Notice: Subject to any disclaimer, the term of this patent is extended or adjusted under 35 U.S.C. 154(b) by 1181 days.

(21) Appl. No.: 09/950,288

(22) Filed: Sep. 10, 2001

(65) Prior Publication Data

US 2003/0048748 A1   Mar. 13, 2003

(51) Int. Cl.
*G01R 31/08* (2006.01)
(52) U.S. Cl. .................................... 370/224; 370/245
(58) Field of Classification Search ............... 370/217, 370/221, 222, 223, 224, 242, 245, 248
See application file for complete search history.

(56) References Cited

U.S. PATENT DOCUMENTS

| | | | | |
|---|---|---|---|---|
| 5,307,353 A | * | 4/1994 | Yamashita et al. ............. 714/4 |
| 5,406,401 A | * | 4/1995 | Kremer .......................... 398/4 |
| 5,751,696 A | * | 5/1998 | Bechtel et al. ............... 370/223 |
| 5,841,760 A | * | 11/1998 | Martin et al. ............... 370/242 |
| 5,870,382 A | * | 2/1999 | Tounai et al. ............... 370/220 |
| 6,181,676 B1 | * | 1/2001 | Yao et al. .................... 370/226 |
| 6,317,414 B1 | * | 11/2001 | Naohiro ...................... 370/222 |
| 6,654,341 B1 | * | 11/2003 | Chi et al. .................... 370/216 |
| 6,940,810 B1 | * | 9/2005 | Roa-Diaz .................... 370/217 |

* cited by examiner

*Primary Examiner*—Ricky Ngo
*Assistant Examiner*—Christine Ng
(74) *Attorney, Agent, or Firm*—Clements Bernard PLLC; Christopher L. Bernard; Tyler S. Brown (57) ABSTRACT

A system and method for providing embedded UPSR protection for SONET networks is described. The STS channels for working and protection rings of a SONET network are input to a SONET overhead processor. The overhead processor comprises a monitor circuit for each standby and working ring. The monitor circuits monitor their respective input STS channels and detect any defined error conditions and/or defined operator commands or anomaly conditions. An unused overhead portion of the input STS channel is dedicated for encoding a binary value representing an error or command condition. In the event of an error or command condition, the highest value is encoded in the dedicated portion of the STS channel. The output from each monitor circuit is input into a comparator circuit of a cross-connect circuit coupled to the overhead processor. The comparator circuit selects the STS channel with the lowest encoded defect or command condition value and outputs this STS channel as data traffic to downstream network devices.

23 Claims, 11 Drawing Sheets

| B0 | B1 | B2 | B3 | B4 | B5 | B6 | B7 |
|---|---|---|---|---|---|---|---|
| NR CONFIGURATION || OPERATOR COMMANDS ||| RESERVED |||

FIG.4

| B0 | B1 | DEFINITION |
|---|---|---|
| 0 | 0 | NO REQUEST - NON REVERTIVE MODE |
| 0 | 1 | RESERVED |
| 1 | 0 | NO REQUEST - WORKING - REVERTIVE MODE |
| 1 | 1 | NO REQUEST - PROTECTION - REVERTIVE MODE |

FIG.5

| B2 | B3 | B4 | DEFINITION |
|---|---|---|---|
| 0 | 0 | 0 | CLEAR |
| 0 | 0 | 1 | RESERVED |
| 0 | 1 | 0 | RESERVED |
| 0 | 1 | 1 | RESERVED |
| 1 | 0 | 0 | MANUAL SWITCH |
| 1 | 0 | 1 | FORCED SWITCH |
| 1 | 1 | 0 | LOCKOUT |
| 1 | 1 | 1 | OOS/MA |

| MANUAL SWITCH | 1000 0000 |
| --- | --- |
| RESERVED | 1000 0001 - 1000 0011 (3) |
| NO REQUEST - (NON REVERTIVE MODE) | 1000 0100 |
| NO REQUEST - WORKING (REVERTIVE MODE) | 1000 0101 |
| NO REQUEST - PROTECTION (REVERTIVE MODE) | 1000 0110 |
| RESERVED | 1000 0111 |
| WTR | 1000 1000 |
| RESERVED | 1000 1001 - 1000 1111 (7) |
| SD $10^{-9}$ | 1001 0000 |
| SD $10^{-8}$ | 1001 0001 |
| SD $10^{-7}$ | 1001 0010 |
| SD $10^{-6}$ | 1001 0011 |
| SD $10^{-5}$ | 1001 0100 |
| RESERVED | 1001 0101 - 1001 1111 (11) |

FIG. 10A

| | | 1000 |
|---|---|---|
| PDI = E1 | 1010 0000 | |
| PDI = E2 | 1010 0001 | |
| PDI = E3 | 1010 0010 | |
| PDI = E4 | 1010 0011 | |
| PDI = E5 | 1010 0100 | |
| PDI = E6 | 1010 0101 | |
| PDI = E7 | 1010 0110 | |
| PDI = E8 | 1010 0111 | |
| PDI = E9 | 1010 1000 | |
| PDI = EA | 1010 1001 | |
| PDI = EB | 1010 1010 | |
| PDI = EC | 1010 1011 | |
| PDI = ED | 1010 1100 | |
| PDI = EE | 1010 1101 | |
| PDI = EF | 1010 1110 | |
| PDI = F0 | 1010 1111 | |
| PDI = F1 | 1011 0000 | |
| PDI = F2 | 1011 0001 | |
| PDI = F3 | 1011 0010 | |
| PDI = F4 | 1011 0011 | |
| PDI = F5 | 1011 0100 | |
| PDI = F6 | 1011 0101 | |

FIG. 10B

| | |
|---|---|
| PD1 = F7 | 1011 0110 |
| PD1 = F8 | 1011 0111 |
| PD1 = F9 | 1011 1000 |
| PD1 = FA | 1011 1001 |
| PD1 = FB | 1011 1010 |
| PD1 = FC | 1011 1011 |
| RESERVED | 1011 1100 - 1011 1111 (4) |
| TIM | 1100 0000 |
| RESERVED | 1100 0001 - 1100 1111 (15) |
| SF $10^{-5}$ | 1101 0000 |
| SF $10^{-4}$ | 1101 0001 |
| SF $10^{-3}$ | 1101 0010 |
| RESERVED | 1101 0011 - 1101 1111 (13) |
| AIS-P, LOP-P, UNEQ-P | 1110 0000 |
| RESERVED | 1110 0001 - 1110 1111 (15) |
| FORCED SWITCH | 1111 0000 |
| RESERVED | 1111 0001 - 1111 0111 (7) |
| LOCKOUT | 1111 1000 |
| RESERVED | 1111 1001 - 1111 1011 (3) |
| OOS/MA | 1111 1100 |
| RESERVED | 1111 1101 - 1111 1110 (2) |
| NO SIGNAL | 1111 1111 |

PROVIDING EMBEDDED PROTECTION IN A NETWORK CROSS-CONNECT DEVICE FOR SONET NETWORKS

FIELD OF THE INVENTION

The present invention relates generally to communication networks, and more specifically to a system for providing embedded protection in a network cross-connect devices for SONET networks.

BACKGROUND OF THE INVENTION

Large computer networks, such as Wide Area Networks (WAN) or Internet backbone systems often incorporate various types of network devices (nodes) and network protocols. The SONET (Synchronous Optical Network) system is a high bit-rate fiber-optic based transport system that has become a well established standard for linking low and high-speed devices such as switches and multiplexers in wide-scale networks.

SONET uses a self-healing ring architecture of two or more transmission paths between network nodes. If there is a break or error condition in one line, the other line is utilized to provide automatic protection against failures. Various ring topologies are possible for SONET systems, including two-fiber and four-fiber bidirectional line switched protected rings (BLSR) and two-fiber unidirectional path switched ring (UPSR). SONET is bandwidth flexible and operates at line rates from VT1.5 to OC-768 (and potentially higher) regardless of network size. In general, for SONET systems, line rate specific OC-n network elements are utilized at each point node location. The data traffic is fitted into specific bandwidth slots, and signal concatenation schemes are used to extend payload envelopes for supporting dense data transfers. A SONET layer is comprised of section, line and path components. Regardless of the data transfer rate, a SONET frame contains only one section and line layer with their corresponding overhead. At the path layer, however, the potential number of STS frames and their corresponding overhead depends on the data transfer rate of the Optical Carrier (OC). An OC-n, where n is typically equal to 1, 3, 12, 48, 192 and 768, consists of potentially n STS frames. The exact number of STS frames depends on the type and number of concatenated STS frames used (e.g., STS-3c or STS-12c). If none are concatenated, the number of STS frames is equal to n, otherwise the number of frames is smaller than n.

SONET networks provide various protection mechanisms. Examples include APS (Automatic Protection Switching) 1:1 protection that provides line redundancy, and APS 1+1 protection that provides card and line redundancy. These schemes involve monitoring individual transmission lines in the SONET network and selecting the one with the better quality. These line layer protection schemes generally do not increase in complexity with the data transfer rate, since only a single line is monitored in all cases. For the path layer protection, a common protection mechanism is UPSR (unidirectional path switched ring). As the data rate increases, there are more STS paths to monitor. A common UPSR protection scheme relies on a selector circuit placed between network node for each counter-rotating ring of the SONET network. The selector monitors STS signals from one ring and STS signals from the other (counter-rotating) ring and compares the two signals. Each STS signal includes various quality measurement data items, such as bit error rate, and so on. The selector examines this information from each STS signal and selects the signal of higher quality. For the above simple example, the user sees only one STS signal, even though the ring transmits or passes two STS signals. However, as the data rate increases, the number of STS selection operations also increases. Thus, for OC-3, the selector circuit selects among three pairs of STS signals (three pair are received from one ring and the other three pair are received from the counter rotating ring), for OC-12, the selector circuit selects among twelve pairs of STS signals, and for OC-192, the selector circuit selects among 192 pairs of STS signals. This selection operation can impose a great processing load on the central processor, especially at higher data rates. In practical applications, the selection operation must be performed within a certain maximum time period, for example selections must be made within 50 milliseconds. For high data rate networks, the UPSR selection requirements may exceed the bandwidth availability of the central processing unit.

Figure 1:
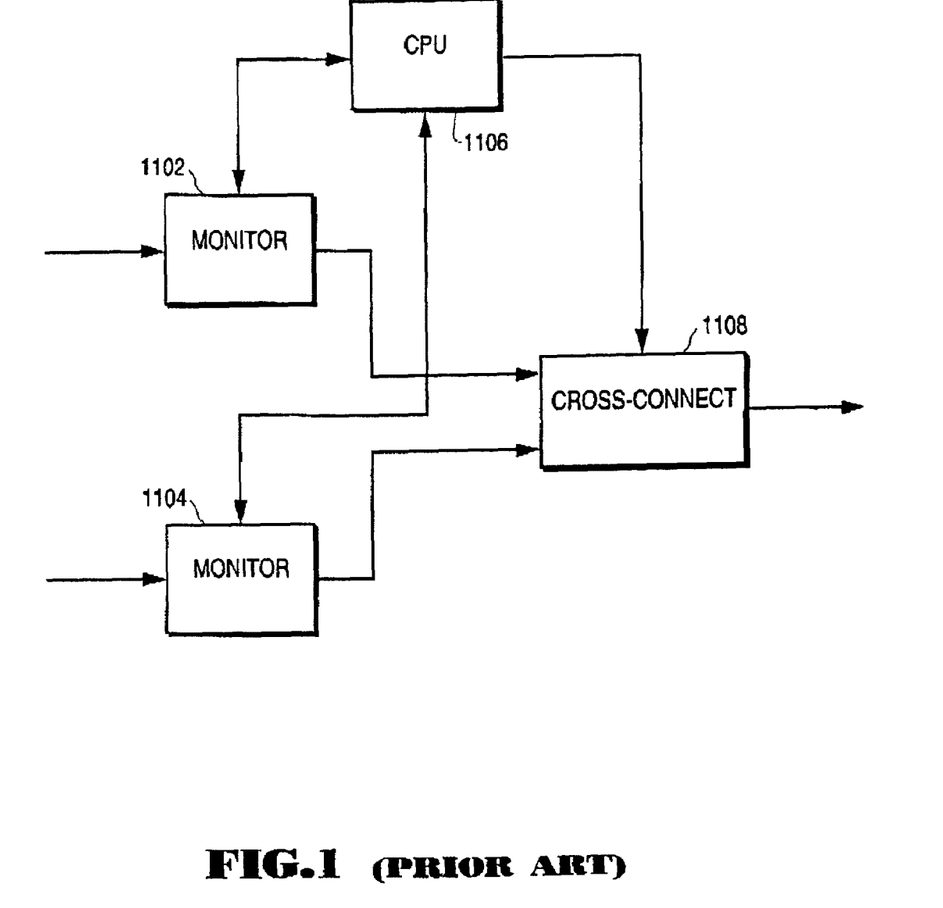
FIG. 1 illustrates a present known method of providing ring switching in SONET network.

A further disadvantage of present SONET networks is that typical cross-connect or multiplexer devices are not capable of automatic reconfiguration in the event of failure or user command conditions. Cross-connect devices are intended to provide switching functionality from working rings to standby rings in the event of failure or forced switching conditions. Most present cross-connect devices must be programmed or manually set to switch between working and protection rings. For example, in most present software switching solutions, when a defect is detected, a signal is sent to a central processing unit (CPU). The CPU then re-provisions the cross-connect to switch from the working ring to the protection ring (or from the protection ring to the working ring). An example of this type of prior art switching method utilizing a CPU to re-provision a network cross connect is illustrated in FIG. 1. In FIG. 1, a CPU 1106 is coupled between monitor circuits 1102 and 1104 and cross-connect 1108. The STS channel outputs are transmitted from the monitor circuits to the CPU. Depending upon the relative quality of the input STS signals, the CPU programs the cross-connect 1108 to select the higher quality STS channel. This present CPU-based switching method adds complexity and increases switching latencies in many SONET applications.

What is needed, therefore, is a UPSR protection mechanism for SONET networks that provides automatic reconfiguration of network cross connect devices in the event of the detection of error conditions for a large number of STS frames, and that eliminates the CPU from the ring selection process.

SUMMARY OF THE INVENTION

A system and method for providing embedded protection in network cross-connect devices in SDH (Synchronous Digital Hierarchy) networks is described. In one embodiment, an embedded protection mechanism is provided for UPSR protection in SONET networks. The STS channels for working and protection rings of a SONET network are input to a SONET overhead processor. The overhead processor comprises a monitor circuit for each standby and working ring. The monitor circuits monitor their respective input STS channels and detect any defined error conditions and/or defined operator commands or anomaly conditions. An unused overhead portion of the input STS channel is dedicated for encoding a binary value representing an error or command condition. In the event of multiple error or command conditions, the highest value is encoded in the dedicated portion of the STS channel. The output from each monitor circuit is input into a comparator circuit of a cross-connect circuit coupled to the overhead processor. The comparator circuit selects the STS channel with the lowest encoded defect or command condition value and outputs this STS channel as data traffic to downstream network devices.

Other objects, features, and advantages of the present invention will be apparent from the accompanying drawings and from the detailed description that follows below.

BRIEF DESCRIPTION OF THE DRAWINGS

The present invention is illustrated by way of example and not limitation in the figures of the accompanying drawings, in which like references indicates similar elements, and in which.

DETAILED DESCRIPTION OF THE INVENTION

A system for providing embedded UPSR protection in a self-configuring cross-connect switch for SONET networks or other types of SDH networks with similar topology is described. In the following description, for purposes of explanation, numerous specific details are set forth in order to provide a thorough understanding of the present invention. It will be evident, however, to one of ordinary skill in the art, that the present invention may be practiced without these specific details. In other instances, well-known structures and devices are shown in block diagram form to facilitate explanation. The description of preferred embodiments is not intended to limit the scope of the claims appended hereto.

Figure 11:
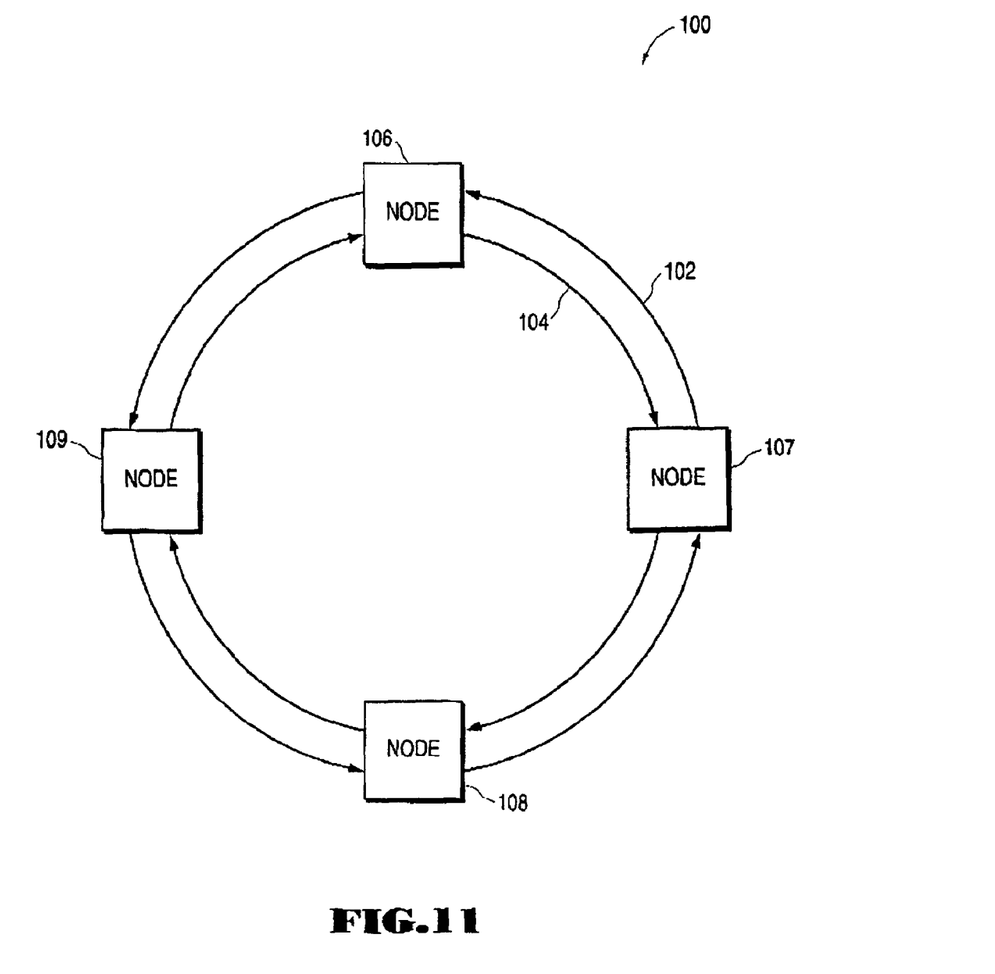
FIG. 11 illustrates an exemplary SONET ring that implements an embedded UPSR protection mechanism, according to one embodiment of the present invention.

Embodiments of the embedded UPSR protection mechanism of the present invention is primarily implemented in a SONET (Synchronous Optical Network) based fiber optic network. FIG. 11 is an architectural diagram of a data communication network incorporating a SONET ring that can implement embodiments of the embedded UPSR protection mechanism. A SONET network generally uses two or four transmission paths between network nodes in a ring configuration. The ring that connects the nodes (network elements) together in a SONET network is typically a bi-directional counter-rotating ring. The SONET ring 100 illustrated in FIG. 11 is a two path ring that includes a number of network elements (nodes) 106, 107, 108, and 109 coupled through fiber paths 102 and 104. In ring 100, fiber path 104 is a clockwise ring that connects the nodes together, and fiber path 104 is a counter-clockwise ring that connects the nodes together. The SONET system features a self-healing ring architecture that is able to reroute traffic if either path 102 or 104 fails. One path is typically denoted the "working ring", such as clockwise path 102, while the other path is denoted the "standby ring" or "protection ring", such as counter-clockwise path 104. It should be noted that various different ring topologies are possible, such as four-fiber bi-directional line switched rings (BLSR) or two-fiber uni-directional path switched rings (UPSR), and can be used in conjunction with embodiments of the present invention.

The actual type of devices embodied by the network element nodes 106-109 depends upon the network environment and application in which the SONET ring is used. For a typical SONET network, the nodes are usually digital cross-connect (DCS) devices, or add-drop multiplexer (ADM) devices. Some nodes may be devices that may incorporate both ADM and DCS functionality. The function of a digital cross connect is to switch and multiplex low-speed voice and data signals onto high-speed lines, and vice versa. An add-drop multiplexer multiplexes lower-speed electrical and/or optical signals into a high-speed optical channel and vice versa.

Figure 2:
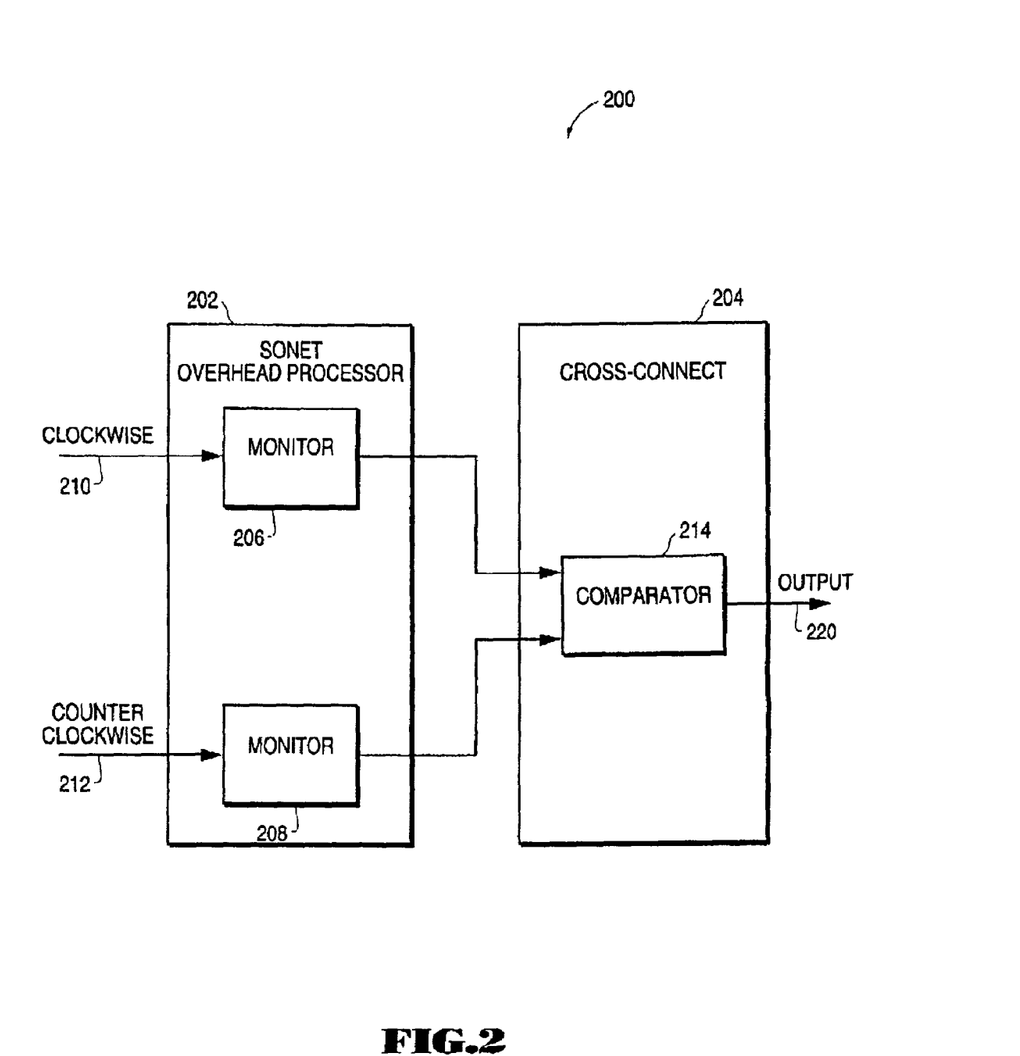
FIG. 2 illustrates an overhead processor circuit for providing embedded UPSR protection for SONET networks, according to one embodiment of the present invention.

In one embodiment of the present invention, a SONET Overhead Processor (SOP) is included within one or more nodes of a SONET network. The overhead processor operates as a generic SDH/SONET overhead processor device, including transport overhead and path overhead, and STS pointer processor, in OC-N interface card applications. For implementing an embedded UPSR protection mechanism, the overhead processor monitors the fiber path rings to detect section, line and path level anomalies and defects in an incoming SONET signal. In one embodiment, a monitor circuit is provided in the overhead processor for each incoming fiber path. FIG. 2 illustrates an overhead processor circuit for providing embedded UPSR protection for SONET networks, according to one embodiment of the present invention. The SONET overhead processor 202 includes a first monitor circuit 206, and a second monitor circuit 208. Monitor circuit 206 receives input from the clockwise path 210 and monitor circuit 208 receives input from the counter-clockwise path 212. The output from the overhead processor 202 is provided to cross-connect circuit 204.

The monitor circuits 206 and 208 monitor the STS channels of their respective incoming SONET signals, and are configured to detect any section, line and path level anomalies in the signals. The monitor circuits can also be configured to take account of any particular operator commands that may be encoded within the SONET signals.

Although the circuit of FIG. 2 illustrates a SONET overhead processor that is used for a two-path SONET ring, a similar system can be used for four-path rings. In this alternative embodiment, overhead processor 202 includes four monitor circuits, one for each of the separate ring paths. In either the two-ring or four-ring embodiments, separate monitor circuits can be provided for each separate ring, or a single monitor circuit can be provided for all of the ring paths.

For the embodiment illustrated in FIG. 2, the overhead processor 202 and cross-connect 204 are illustrated as separate components. Alternatively, however the overhead processor and cross-connect circuits can be implemented as a single discrete circuit. Moreover, an add-drop multiplexer can be included along with, or instead of cross-connect circuit 204, depending upon the application in which the overall circuit 200 is used.

The monitor circuits within the overhead processor 202 of FIG. 2 include anomaly/defect detection mechanisms and algorithms that conform to GR-253-CORE and GR-1400-CORE standards (including hysteresis mechanisms for clearing of signal degrade/signal fail conditions). The overhead processor is configured to detect a bit error rate (BER) of between $10^{-3}$ and $10^{-9}$ errors. Various other error conditions or pre-defined user commands are also identified.

If a defect, error condition, or other identifiable event occurs, the overhead processor encodes this condition in an unused overhead byte of the STS channel that is being monitored. In general, every STS channel has at least one unused overhead byte. One such byte is referred to as the F1 byte. In one embodiment of the present invention, the overhead processor uses the F1 byte of the section overhead to encode the incoming anomaly/defect for each STS channel of the incoming OC-N signal in the STS-N stream going downstream to cross-connect 204. The F1 byte encodes information corresponding to the STS channel to which it belongs. In addition to the standard STS level defects, the overhead processor translates section/line level defects into corresponding path level defects which then get encoded in each of the F1 bytes for each STS channel impacted by the anomaly/defect.

To enable bypassing of the embedded protection mechanism in certain applications, the overhead processor can include a means to both enable and disable the encoding of defect information in the STS overhead byte. If a minimum bit error rate cannot be detected by the overhead processor, a mechanism is provided to indicate the calculated bit error rate to the overhead processor so that the right tag is added to the STS path. The overhead processor can also includes a mechanism to monitor the toggling of a defect. For this particular embodiment, the overhead processor can lock a particular defect as active for a pre-defined period of time.

Figure 3:
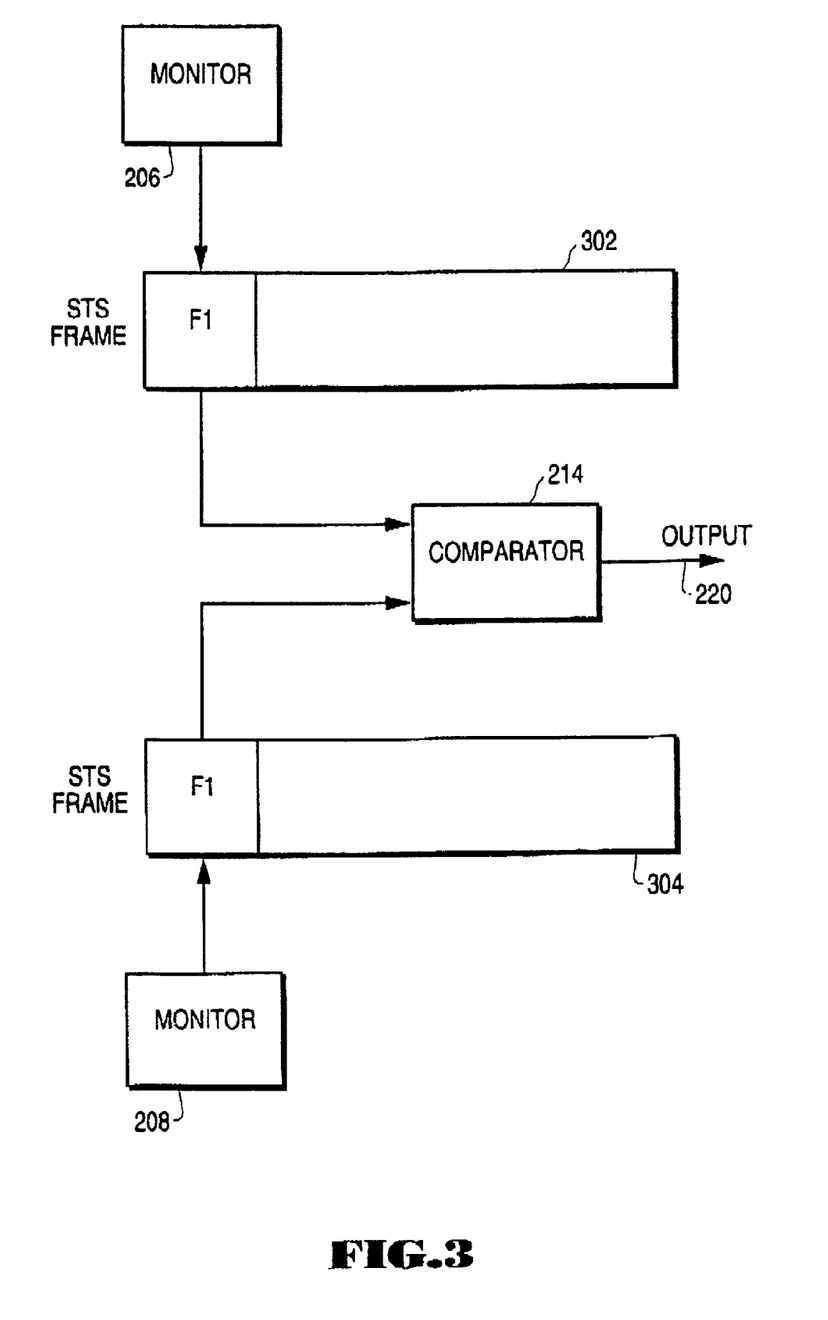
FIG. 3 illustrates the coding of a defect within an unused overhead byte of an STS channel, according to one embodiment of the present invention.

FIG. 3 illustrates the coding of a defect within an unused overhead byte of an STS channel, for the overhead processor illustrated in FIG. 2. The monitor circuit 206 for the clockwise ring, encodes any detected defects or special operator commands into the F1 byte of STS channel 302. Similarly, monitor circuit 208 for the counter-clockwise ring encodes any detected defects or special operator commands into the F1 byte of STS channel 304. This operation is referred to as "tagging" the STS with any detected defects or anomaly conditions. In general, the overhead processor codes the same F1 value for all the STS channels that are part of an STS-Nc. It should be noted that any unused overhead byte of the STS channel, other than the F1 byte can be used to code any detected defects.

In one embodiment, the overhead processor uses all eight bits of the F1 byte for anomaly/defect encoding. Alternatively, fewer bytes of the F1 byte can be used. Similarly greater than eight bytes can be used, in which case a second or third unused overhead byte may also be employed for defect coding.

The overhead processor also includes means to provision whether a defect is to be encoded or not. This selection mechanism allows particular types of defects to be detected or masked. Various different defects can be monitored. In one embodiment, the overhead processor is programmed to detect the following SONET error types: SD-BER-P, PDI, TIM-P, SF-BER-P, AIS-P, LOP-P, UNEQ-P, and PLM-P type errors. It should be noted that any other type of present or future-defined SONET signal error can also be monitored for detection.

In one embodiment of the present invention, the overhead processor will encode the tagging byte (e.g., F1 byte) of the STS channel with a binary value that represents the type or severity of the defect. The various detectable defects are assigned a binary value or relative severity value. The tagging byte is then used to encode defects in an increasing order of severity. For example, a signal failure will have a higher numeric value than a signal degrade condition. This facilitates easy and consistent comparisons in downstream devices, such as cross-connect 204.

As illustrated in FIGS. 2 and 3, the output signals from each of the monitor circuits is transmitted to a comparator circuit 214 in the cross-connect device 204. The comparator selects the signal with the fewer defects (higher quality). This is accomplished by selecting the STS channel with the lowest F1 byte value if more severe defects are binary coded high, or selecting the STS channel with the highest F1 byte value if more severe defects are binary coded low. The higher quality STS signal is then transmitted from cross connect 204 as output signal 220. In this manner, the highest quality signal from either the clockwise or counter-clockwise ring is selected.

The following anomalies and defects can be encoded by the F1 bytes: Bit Error Rate conditions (or Signal Degrade, SD), PDI-P defects, Excessive Bit Error Rate conditions (or Signal Fail, SF), and Hard signal fail conditions (AIS-P, LOP-P, UNEQ-P, Equipment Fail). Section/Line level defects like LOS, LOF, AIS-L, SD-L, SF-L are translated to their path-level counterparts and encoded in the individual STS channels. The overhead processor encodes defect/anomaly values in the F1 bytes consistent with defect soaking and clearing specifications per Bellcore standard GR-253-CORE. The overhead processor may also be configured to provide support for TIM-P and PLM-P defects. It should be noted that embodiments of the present invention can be applied to Virtual Tributary (VT) paths as well as STS paths.

Besides defects, the overhead processor can be configured to tag the STS channel for particular conditions and operator commands. In one embodiment, the following conditions and operator commands are encoded in the F1 byte, lockout, forced switch, manual switch, and wait to restore (WTR) commands, and any other values or type of codes that may be added in the future.

Figure 10:
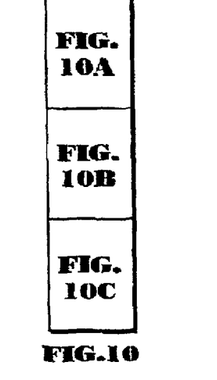
FIG. 10 illustrates a table that includes representative bit assignments for the F1 byte for various anomalies/defects and other conditions.
Figure 10A:
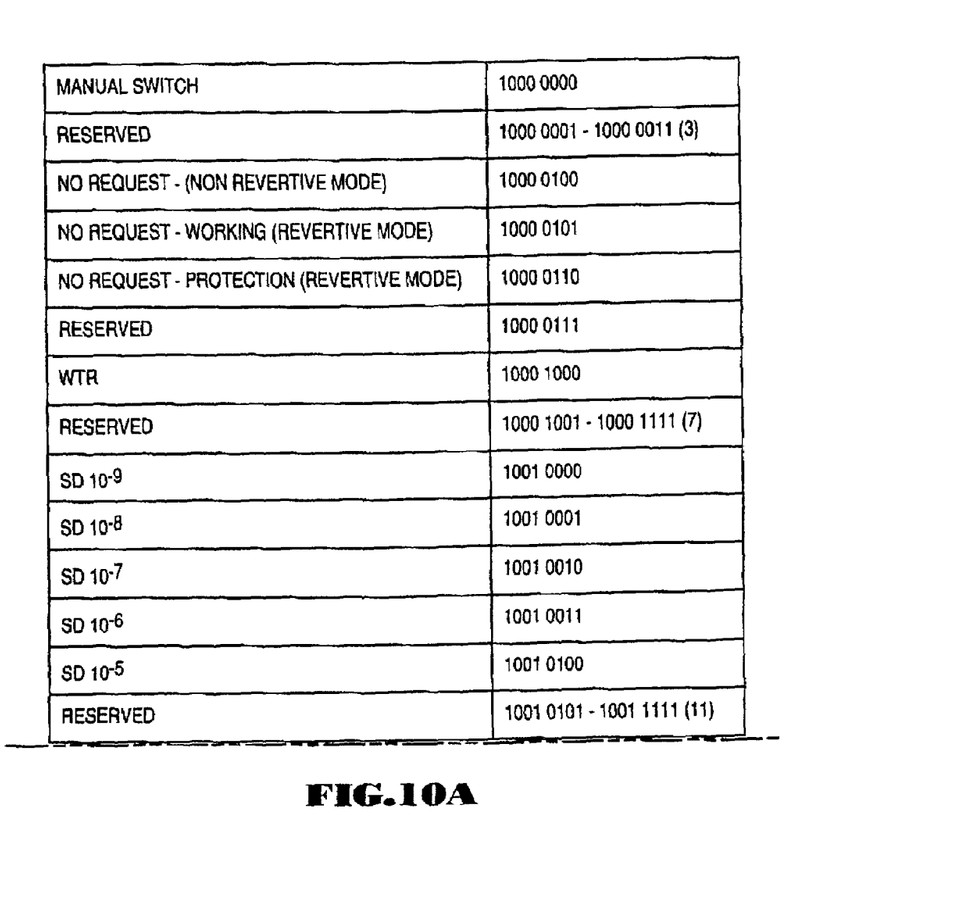
Figure 10B:
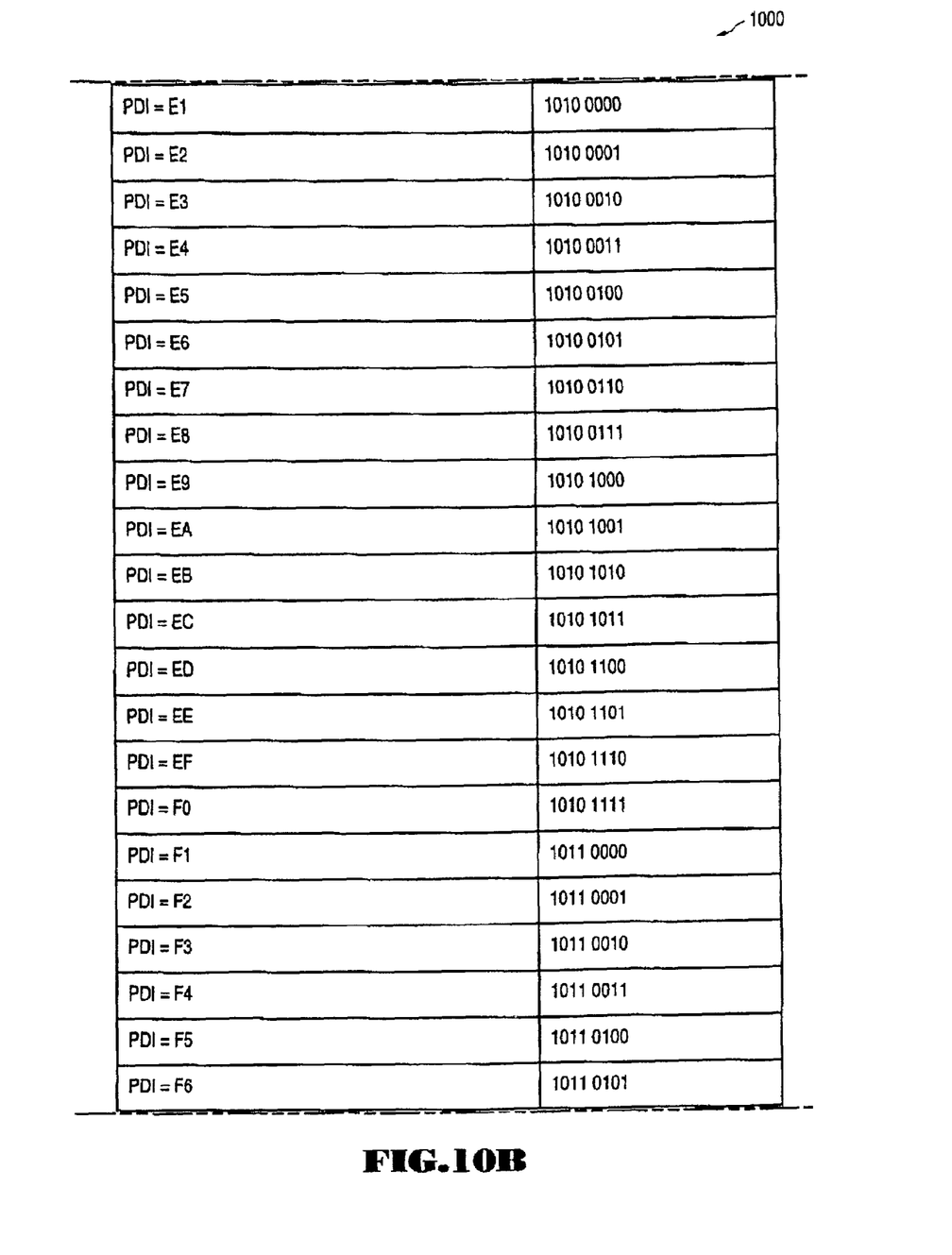
Figure 10C:
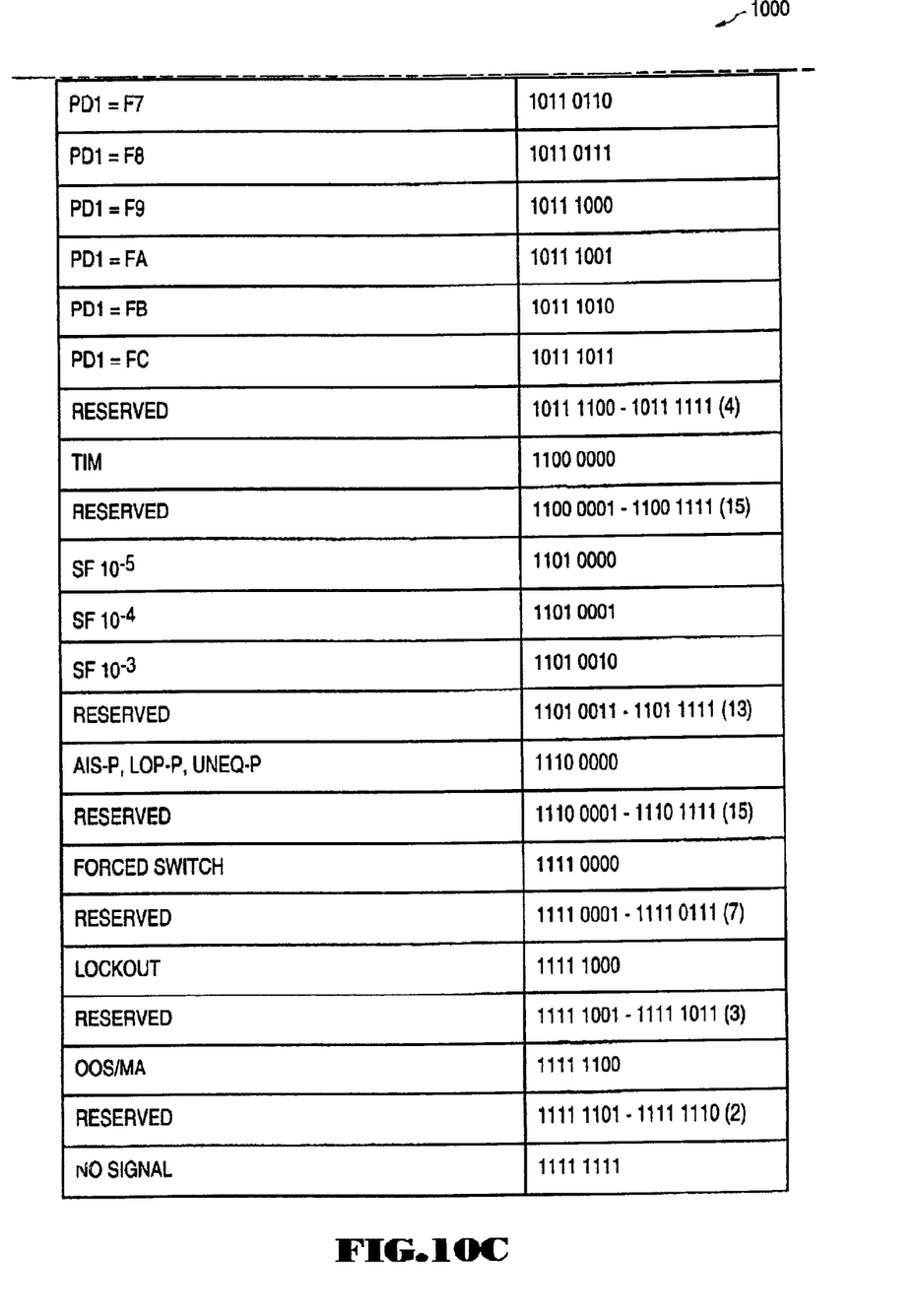

Depending upon the actual implementation of the overhead processor, various programming schemes for defining and encoding detectable events are possible. FIG. 10 illustrates a table that includes representative bit assignments for the F1 byte for various anomalies/defects and other conditions. Table 1000 is included for reference purposes, and other bit assignments for tagging bytes within an STS channel are possible. Table 1000 illustrates the assignment of defects and detectable conditions in order of increasing severity assigned higher binary values. In the event of multiple failures, the overhead processor can be configured to encode only the highest priority failure. For this embodiment, if an existing condition is encoded in the F1 byte, and a higher priority condition occurs then the higher priority condition shall replace the existing condition in the F1 encoding. Alternatively, multiple error conditions can be combined to give an aggregated signal quality value. The overhead processor also includes means to specify the value to be sent in the F1 byte when no defect is available.

Figure 4:
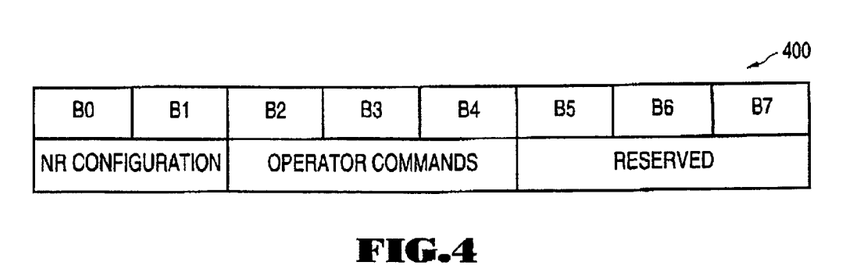
FIG. 4 illustrates an eight-bit configuration register that codes operator commands and various operational parameters for the overhead processor, according to one embodiment of the present invention.

In one embodiment, defect conditions can be detected, encoded and transmitted automatically by the overhead processor to the F1 byte, while for operator commands, an eight-bit (or similar) register can be used to specify the value to be sent in the F1 byte. For this embodiment, the binary definition of the various operator commands is pre-defined. FIG. 4 illustrates an eight-bit configuration register that codes operator commands and various operational parameters for the overhead processor, according to one embodiment of the present invention. As shown in table 400, bits B3-B5 code the operator commands. The various different operator commands and their respective bit assignments is illustrated in table 600 illustrated in FIG. 6.

Figure 5:
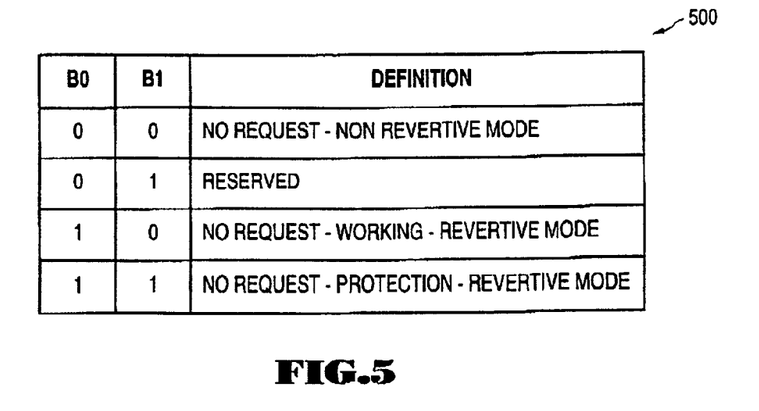
FIG. 5 is a table that lists the bit assignments for the NR (non-revertive) configuration bits of the configuration register of FIG. 4.

For SONET systems, UPSR protection mechanisms may be configured to be either revertive or non-revertive mode. A revertive system re-transmits data traffic on the working ring once the standby ring has been used and the defect condition on the working ring is cleared. In non-revertive mode, the standby ring is used once it has been switched to (unless and until a defect is detected on the protection channel), even after the defect condition is cleared on the working ring. In one embodiment of the present invention, the overhead processor can be programmed to select either revertive mode or non-revertive mode. As illustrated in FIG. 4, bits BO and BI of the configuration register are dedicated to defining whether revertive or non-revertive mode is selected. Table 500 of FIG. 5 lists the bit assignments for the NR (No Request) configuration bits of the configuration register 400. If non-revertive mode is specified, the input to the overhead processor stays with either the working or protection ring until a defect on the selected ring is detected. For revertive mode the working ring is used during normal operating conditions, and the overhead processor can be programmed in such a way that the cross-connect will select the working ring when no defect is detected on this ring.

In one embodiment, the overhead processor includes a means to provision the value of a WTR (wait to restore) timer. In general, one value is used by all STS channels. Typical values of the WTR timer are between 0 and 15 minutes. Each STS channel is provided with a separate WTR timer.

If the provisioning mode of an STS channel is selected to be revertive, then upon clearing of an anomaly or defect, the overhead processor encodes the WTR timer in the F1 byte for the STS channel. The overhead processor then starts a WTR timer for the STS with the specified time value. The WTR timer is reset if the defect is detected again and is restarted when the defect is cleared. Upon expiration of the WTR timer (in revertive mode) in an STS channel, the overhead processor shall source a No Request-Working or No Request-Protection mode based on the configuration of the system in the F1 byte for the corresponding STS channel.

Figure 7:
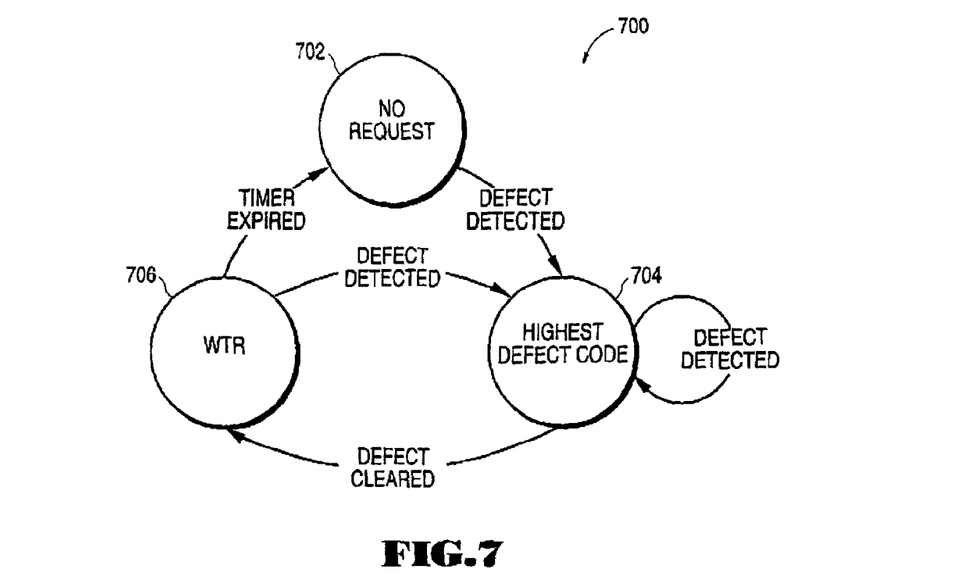
FIG. 7 is a state diagram that illustrates the behavior of the overhead processor in revertive mode, according to one embodiment of the present invention.

FIG. 7 is a state diagram that illustrates the behavior of the overhead processor in revertive mode, according to one embodiment of the present invention. As shown in state diagram 700, the no request state 702 is the default state until a defect is detected. If a defect is detected the highest defect code 704 is encoded in the tagging (e.g., F1) byte of the STS channel. If other defects are detected, the STS channel is tagged with the value of the highest defect. When the defect is cleared, the WTR timer 706 is initiated. Upon expiration of the timer, the working ring is selected and the no request state is entered. If defect is detected during the period of the WTR timer, the STS channel is tagged with the highest defect code 704.

Figure 8:
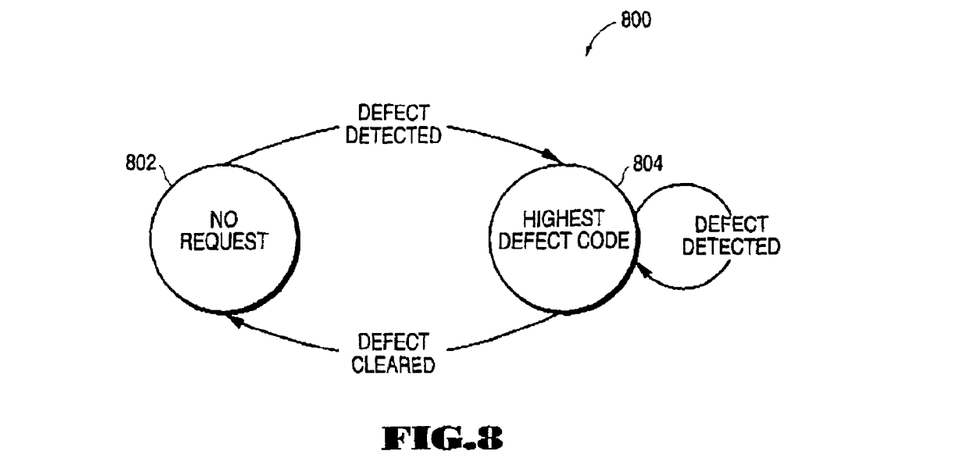
FIG. 8 is a state diagram that illustrates the behavior of the overhead processor in non-revertive mode, according to one embodiment of the present invention.

FIG. 8 is a state diagram that illustrates the behavior of the overhead processor in non-revertive mode, according to one embodiment of the present invention. As shown in state diagram 800, the default no request state 802 is maintained until a defect is detected, at which point the highest defect code 804 is encoded in the tagging byte of the STS channel. If other defects are detected, the STS channel is tagged accordingly. Once the defect is cleared, the no request state 802 is entered.

In one embodiment, various operational parameters can be encoded within the tagging byte of the STS channel. For example, during initialization, the overhead processor sources the value of hex FF in the F1 bytes to indicate that the STS channel is not yet ready for active duty. Various steps may be required to provision the overhead processor for operation. For example, prior to operation, the value of the WTR timer must be specified. In general, this value is used by all incoming STS channels. For each STS, the configuration register is provisioned. This is typically accomplished through routines in the operating system software governing the operation of the SONET system 200. During normal operation, the operator command is set to clear. The NR configuration bits of the configuration register 400 are set to the appropriate protection mode configuration, i.e., revertive or non-revertive mode. When there is no failure, the overhead processor tags the STS channel with the provisioned NR configuration. If a defect is detected, the NR configuration bits are replaced by the defect code. Once the defect is cleared, the STS tag is returned to the NR configuration, in the case of non-revertive mode, or to WTR in the case of revertive mode.

Figure 6:
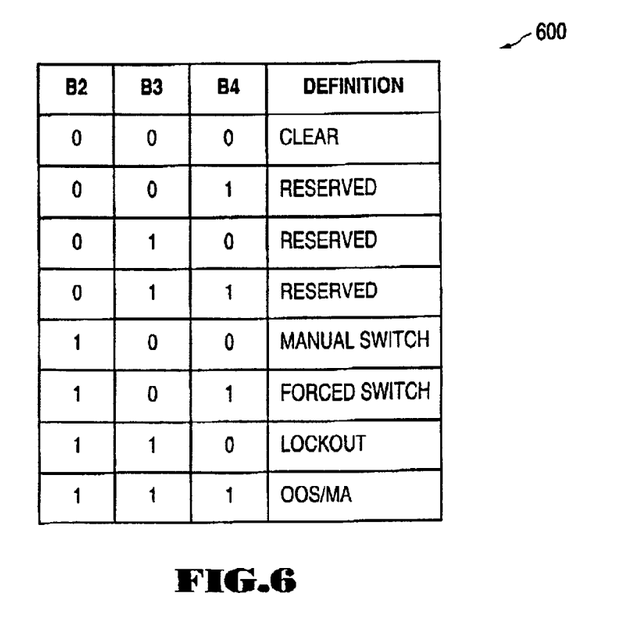
FIG. 6 is a table that lists various different operator commands and their respective bit assignments for the configuration register illustrated in FIG. 5.

Besides system defects, the overhead processor can be configured to tag the STS with codes reflecting operator commands, as illustrated in FIG. 6. In the case of a manual switch, the system software sets the operator command bits of configuration register 400 to the appropriate value. As long as no defect is detected, the manual switch tag is sent with the STS channel. Once a defect is detected, the STS tag is replaced with the defect tag, and the manual switch field is cleared. In the case of a forced switch or a lockout command, the operator command bits are set to the appropriate value. In this case, the overhead processor will not replace these bits with any other value until a clear signal is received from the system software.

For the WTR timer, a separate counter is provided that detects the edge of a minute (or other pre-defined unit of time). Whenever a minute is detected, the WTR timer of the STS channels with active WTR timers will be decreased by one. Once the WTR timer of an STS channel reaches zero, the tag of the STS channel is changed to NR. The WTR timer is started just after the minute edge is detected.

Figure 9:
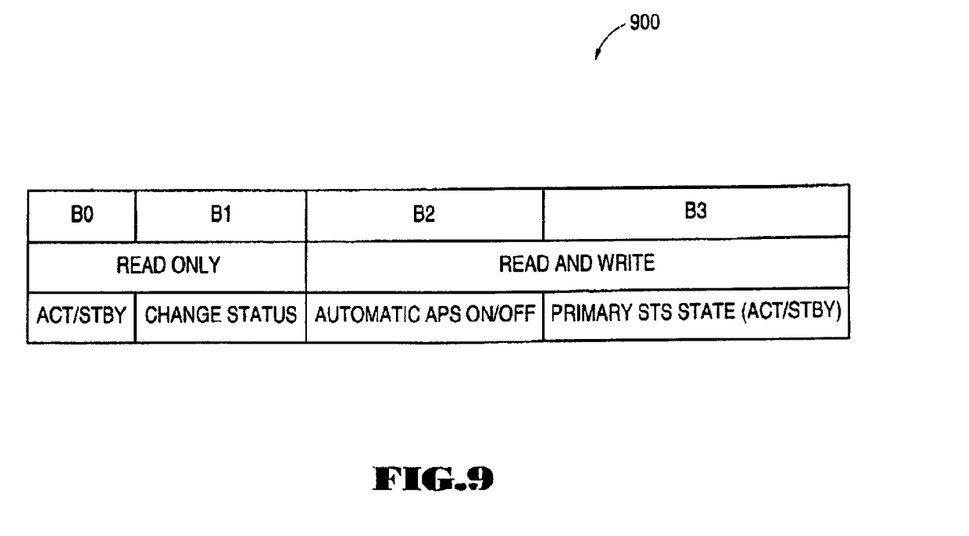
FIG. 9 illustrates a programmable register for the configuration of cross connect 204, according to one embodiment of the present invention.

As illustrated in FIG. 2, the outputs from the monitor circuit s of the overhead processor are input into a comparator circuit of the cross-connect circuit 204. In one embodiment of the present invention, the cross-connect circuit 204 is provided with a programmable register that dictates its operational configuration. FIG. 9 illustrates a programmable register for the configuration of cross connect 204, according to one embodiment of the present invention. The first bit, B0, indicates whether the working STS channel is sourced from the working ring (Active mode) or from the protection ring (Standby mode). The second bit, B1, indicates whether there is a change in the status of the working STS channel. The third bit, B2, indicates whether the automatic protection switching mode is enabled or disabled. The fourth bit, B3, specifies the operator required state of the working STS channel.

During operation, when the automatic APS mode is on, the STS channel with the smallest binary tag (assuming more severe defects are coded with higher values) is selected. If the input STS channels have the same tagged value, no switching is executed. When the automatic APS mode is off, the selected STS channel will be specified by the value of the B3 bit. For example, if B3 is set to binary 1, the working STS channel is selected (Active), and if B3 is set to binary 0, the protection STS channel is selected, and the working STS channel is on standby.

In one embodiment of the present invention, various other operational parameters may be programmed into either the overhead processor 202 or the cross-connect circuit 204. For example, the overhead processor or the cross-connect can be programmed to indicate that protection switch has occurred, and to indicate to the user which of the two paths (working or protection) is selected. A switch to enable or disable the protection switching feature can also be provided. A protection latency feature may also be provided. This feature will allow that no switching occurs unless the tagged byte of one STS channel is lower than the other STS channel for a predetermined number of frames, such as three frames.

Through the STS channel tagging method described above, the cross-connect circuit 204 embodies a self-reconfiguring cross-connect device. The STS channels monitored and tagged with values that represent the severity of any defect or operator command condition that may have occurred. The cross-connect circuit compared the tagged values of the input STS channels and selects the STS channel with the higher quality value. In this manner, the cross-connect automatically switches between the working or protection ring to pass on the highest quality signal to downstream devices in the SONET network. For the sake of efficiency, an unused overhead byte of the STS channel is used to encode the value associated with the defect or command condition. Although reference was made in the Figures and description to the F1 overhead byte, it should be noted that any internal unused byte of the STS frame may be used to implement the tagging feature.

For the embodiment illustrated in FIG. 2, the overhead processor and cross-connect circuit that includes an internal comparator circuit perform the task of monitoring the incoming STS channels, detecting any defects or command conditions, tagging the STS frames with a value representing the detected condition, and switching to the higher quality ring. Such as circuit 200 can be implemented in various different ways, such as through a plurality of integrated circuit devices, or in a single integrated device, such as a single ASIC (application specific integrated circuit device). For this embodiment, a system may include a central processing unit (CPU) to provide system software functionality to circuit 200, such as initiation routines. In an alternative embodiment, the CPU may be utilized to perform the monitoring function or the STS frame tagging function. For this embodiment, the CPU would provide the appropriate signals to the cross-connect that would then switch to the appropriate ring.

Figure 12:
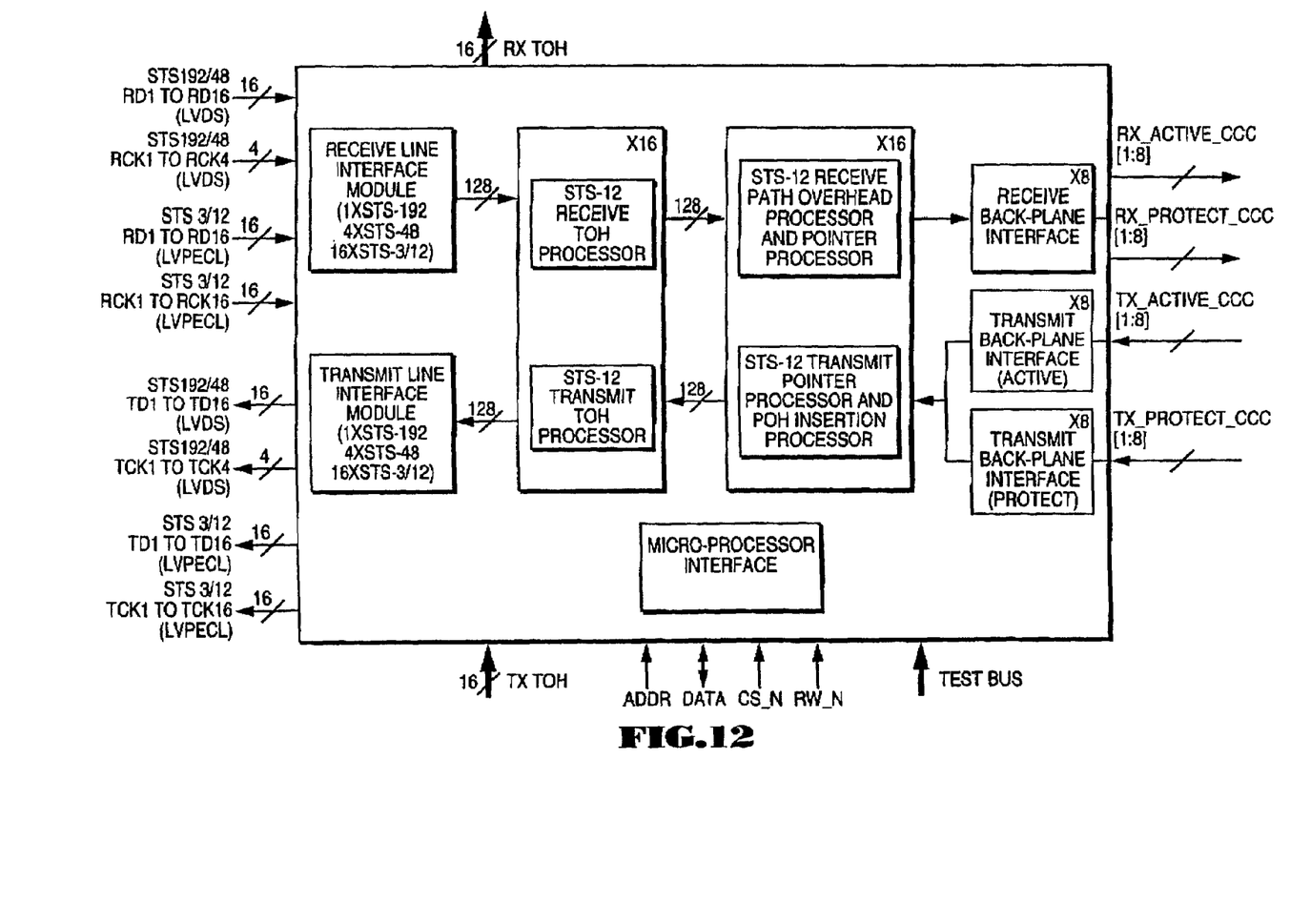
FIG. 12 illustrates is a circuit diagram of an exemplary overhead processor for one embodiment of the present invention.

In one embodiment of the present invention, the overhead processor is embodied within a dedicated SONET overhead processor contained within a backplane device in a SONET network node. FIG. 12 illustrates a block diagram for an exemplary SONET overhead processor that can be used to implement embodiments of the present invention. The overhead processor illustrated in FIG. 12 operates as a generic SDH/SONET overhead processor device, including transport overhead and path overhead, and STS pointer processor, in OC-N interface card applications. Depending upon the application, it can be configured to perform the section, line, and path overhead layer termination for a SONET STS-192 (SDH STM-64) or four STS-48 (STM-16) or 16 STS-12 (STM-4) signals or 16 STS-3 (STM-1) signals. It can also be configured to support any valid mix of STS-1 and STS-3c, STS-12c, STS-48c and STS-192c levels of contiguous concatenation, and support SONET/SDH mix on separate channels.

The circuit of FIG. 12 illustrates a processor that can be programmed with the code values illustrated in table 1000 of FIG. 10. It should be noted that diagram and code table of FIGS. 10 and 12 are intended to provide an exemplary embodiment, and that various other overhead processor architectures are possible.

The description of certain embodiments described a method in which the STS channel is tagged using an unused byte (e.g., F1 overhead byte) of the STS channel. In an alternative embodiment, the STS channel can be tagged with a value representing the detected defect or operator command condition using a tagging byte that is outside of the actual STS channel, but that is associated with the monitored STS channel.

Although the above description refers to SONET networks, it should be noted that embodiments of the present invention may be used in other types of networks that utilize frame based or IP packet data communication schemes. Specifically, embodiments of the present invention are intended to be used to any Synchronous Digital Hierarchy (SDH) network with a similar network topology to SONET networks.

In the foregoing, a system has been described for providing UPSR protection and self-reconfiguring cross-connect devices in SONET network systems. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A method of providing protection switching in a dual ring network, comprising the steps of:
    monitoring a first line in the dual ring network to detect an anomaly and defect condition or a particular condition and operator command in the first line;
    monitoring a second line in the dual ring network to detect an anomaly and defect condition or a particular condition and operator command in the second line;
    translating section/line-level defects detected in the monitoring steps as the anomaly and defect condition to a path-level counterpart;
    determining a bit error rate of the first line and the second line;
    coding a signal frame associated with the first line with a first binary value representing the anomaly and defect condition or a particular condition and operator command in the first line, the first binary value being coded in a first unused overhead byte of the signal frame associated with the first line, wherein the coding associated with the first line is selectively disabled to provide bypassing of embedded protection mechanisms;
    coding a signal frame associated with the second line with a second binary value representing the anomaly and defect condition or a particular condition and operator command in the second line, the second binary value being coded in a second unused overhead byte of the signal frame associated with the second line, wherein the coding associated with the second line is selectively disabled to provide bypassing of embedded protection mechanisms; and responsive to an anomaly and defect condition code or a particular condition and operator command code, switching between the first line and second line in a network cross-connect device coupled to the first and second lines depending upon a difference between the first binary value and the second binary value;

wherein the anomaly and defect condition comprises one of bit error rate conditions, signal degrade, PDI-P defects, excessive bit error rate conditions, signal fail, AIS-P, LOP-P, UNEQ-P, equipment fail, and section/line-level defects comprising LOS, LOF, AIS-L, SD-L, and SF-L; and wherein the particular condition and operator command comprises one of lockout, forced switch, manual switch, and wait-to-restore commands.

2. The method of claim 1 wherein an anomaly condition of the first line and an anomaly condition of the second line comprise a line defect condition.

3. The method of claim 1 wherein the dual ring network comprises an SDH network.

4. The method of claim 3 wherein the dual ring network comprises a SONET network.

5. The method of claim 4 wherein the protection switching comprises a uni-directional path switched ring protection mechanism.

6. The method of claim 4 wherein the signal frame associated with the first line comprises an STS frame transmitted on the first line, and the signal frame associated with the second line comprises an STS frame transmitted on the second line.

7. The method of claim 6 further comprising the steps of:
coding the first binary value in a first unused overhead byte of the STS frame transmitted on the first line; and
coding the second binary value in a second unused overhead byte of the STS frame transmitted on the second line.

8. The method of claim 7 wherein the first unused overhead byte comprises an F1 byte of the STS frame transmitted on the first line, and the second unused overhead byte comprises an F1 byte of the STS frame transmitted on the second line.

9. The method of claim 1, wherein the switching is performed based upon a comparison between the magnitudes of the first and second binary values.

10. A network node for use in a dual ring network, comprising:
an overhead circuit configured to:
monitor a first line in the dual ring network to detect an anomaly and defect condition or a particular condition and operator command in the first line;
monitor a second line in the dual ring network to detect an anomaly and defect condition or a particular condition and operator command in the second line;
translate section/line-level defects detected in the monitoring steps as the anomaly and defect condition to a path-level counterpart;
determine a bit error rate of the first line and the second line;
code a signal frame associated with the first line with a first binary value representing the anomaly and defect condition or a particular condition and operator command in the first line, the first binary value being coded in a first unused overhead byte of the signal frame associated with the first line, wherein the coding associated with the first line is selectively disabled to provide bypassing of embedded protection mechanisms;
code a signal frame associated with the second line with a second binary value representing the anomaly and defect condition or a particular condition and operator command in the second line, the second binary value being coded in a second unused overhead byte of the signal frame associated with the second line, wherein the coding associated with the second line is selectively disabled to provide bypassing of embedded protection mechanisms; and responsive to an anomaly and defect condition code or a particular condition and operator command code, switch between the first line and second line in a network cross-connect device coupled to the first and second lines depending upon a difference between the first binary value and the second binary value;

wherein the anomaly and defect condition comprises one of bit error rate conditions, signal degrade, PDI-P defects, excessive bit error rate conditions, signal fail, AIS-P, LOP-P, UNEQ-P, equipment fail, and section/line-level defects comprising LOS, LOF, AIS-L, SD-L, and SF-L; and wherein the particular condition and operator command comprises one of lockout, forced switch, manual switch, and wait-to-restore commands.

11. The network node of claim 10 wherein the overhead circuit further comprises:
a coding circuit configured to code a binary value to the anomaly and defect conditions or particular conditions and operator commands detected on either the first line or the second line;
a first tagging circuit configured to tag the first set of STS frames with a binary value for the anomaly and defect conditions or particular conditions and operator commands detected on the first line; and
a second tagging circuit configured to tag the second set of STS frames with a binary value for the anomaly and defect conditions or particular conditions and operator commands detected on the second line.

12. The network node of claim 11 wherein the anomaly and defect conditions or particular conditions and operator commands comprises a SONET defect condition.

13. The network node of claim 11 wherein the anomaly and defect conditions or particular conditions and operator commands comprises an operator command condition.

14. The network node of claim 11 wherein the first tagging circuit is operable to code a first binary value in the first unused overhead byte of the STS frame transmitted on the first line and wherein the second tagging circuit is operable to code a second binary value in the second unused overhead byte of the STS frame transmitted on the second line.

15. The network node of claim 14 wherein the first unused overhead byte comprises an F1 byte of the STS frame transmitted on the first line, and the second unused overhead byte comprises an F1 byte of the STS frame transmitted on the second line.

16. The network node of claim 15 wherein the overhead circuit performs a comparison between the relative magnitudes of the first binary value and the second binary value, and selects the first line or the second line depending upon which relative magnitude is higher.

17. A method of providing for automatic protection switching in a self-reconfiguring cross-connect device in a SONET network, comprising the steps of:
monitoring a first STS channel input to an overhead processor coupled to the cross connect device for anomaly and defect conditions or particular conditions and operator commands on a first ring of the SONET network;

monitoring a second STS channel input to the overhead processor for anomaly and defect conditions or particular conditions and operator commands on a second ring of the SONET network;

translating section/line-level defects detected in the monitoring steps as the anomaly and defect condition to a path-level counterpart;

determining a bit error rate of the first STS channel input and the second STS channel input;

assigning a first binary value to the anomaly and defect conditions or particular conditions and operator commands on the first ring of the SONET network;

assigning a second binary value to the anomaly and defect conditions or particular conditions and operator commands on the second ring of the SONET network;

selectively encoding an unused overhead byte in a frame in the first STS channel with the first binary value; and selectively encoding an unused overhead byte in a frame in the second STS channel with the second binary value, wherein the coding associated with the first STS channel input and the second STS channel is selectively disabled to provide bypassing of embedded protection mechanisms, wherein a selection of the first or second STS channel is made based on the encoded overhead bytes, and performing a comparison between relative magnitudes of the first binary value and the second value in a comparator circuit coupled to the cross connect device;

selecting either the first STS channel or second STS channel depending upon the relative values of the first and second binary values;

wherein the relative values of the first and second binary values determine the anomaly and defect conditions or particular conditions and operator commands;

wherein the anomaly and defect conditions comprise one of bit error rate conditions, signal degrade, PDI-P defects, excessive bit error rate conditions, signal fail, AIS-P, LOP-P, UNEQ-P, equipment fail, and section/line-level defects comprising LOS, LOF, AIS-L, SD-L, and SF-L;

wherein section/line-level defects detected in the monitoring steps as the anomaly and defect conditions are translated to their path-level counterparts prior to the assigning steps; and wherein the particular conditions and operator commands comprise one of lockout, forced switch, manual switch, and wait-to-restore commands.

18. The method of claim 17 wherein the selected STS channel represents the STS channel encoded with the binary value of higher relative magnitude.

19. The method of claim 18 further comprising the steps of:
identifying an STS frame of the first STS channel;
identifying an STS frame of the second STS channel;
encoding the first binary value in the identified STS frame of the first STS channel; and
encoding the second binary value in the identified STS frame of the second STS channel.

20. The method of claim 19 further comprising the steps of:
encoding the first binary value in a first unused overhead byte of the identified STS frame of the first STS channel; and
encoding the second binary value in a second unused overhead byte of the identified STS frame of the second STS channel.

21. The method of claim 20 wherein the first unused overhead byte is an F1 byte of the STS frame of the first STS channel and the second unused overhead byte is an F1 byte of the STS frame of the second STS channel.

22. The method of claim 18 wherein the anomaly and defect conditions of the first ring and the anomaly and defect conditions of the second ring comprise a SONET defect condition.

23. The method of claim 18 wherein the particular conditions and operator commands of the first ring and the particular conditions and operator commands of the second ring comprise an operator command condition.

* * * * *